US005421873A

United States Patent [19]

Arimura et al.

[11] Patent Number: 5,421,873

[45] Date of Patent: Jun. 6, 1995

[54] THERMAL TRANSFER INK AND THERMAL TRANSFER ELEMENT USING THE SAME

[75] Inventors: Takao Arimura; Toshihiko Negoro, both of Osaka; Hiroshi Matsumoto, Tokuyama; Ken-ichi Okada, Tokuyama; Masuji Yamamoto, Tokuyama, all of Japan

[73] Assignee: Fujicopian Co., Ltd., Osaka, Japan

[21] Appl. No.: 248,421

[22] Filed: May 24, 1994

[30] Foreign Application Priority Data

May 24, 1993 [JP] Japan .................................. 5-121528

[51] Int. Cl.[6] .............................................. C09D 11/12

[52] U.S. Cl. ............................... 106/31 R; 106/22 H; 106/23 A; 428/488.4

[58] Field of Search ................ 106/31 R, 22 A, 23 A; 428/488.4

[56] References Cited

U.S. PATENT DOCUMENTS

| | | | |
|---|---|---|---|
| 4,612,052 | 9/1986 | Schwartz | 106/31 R |
| 4,636,258 | 1/1987 | Hayashi et al. | 106/31 R |
| 5,008,152 | 4/1991 | Mikamo et al. | 106/31 R |
| 5,151,120 | 9/1992 | You et al. | 106/31 R |

FOREIGN PATENT DOCUMENTS

| | | |
|---|---|---|
| 01047588 | 2/1989 | Japan . |
| 01118484 | 5/1989 | Japan . |

OTHER PUBLICATIONS

*Patent Abstracts of Japan,* vol. 13, No. 360 (M-858), published Aug. 11, 1989 citing Japanese patent 01,118,484, published May 10, 1989.

*Patent Abstracts of Japan,* vol. 13, No. 234 (M-832), published May 30, 1989 citing Japanese patent 01,047,585, published Feb. 22, 1989.

*Primary Examiner*—Helene Klemanski

*Attorney, Agent, or Firm*—Fish & Neave

[57] ABSTRACT

A thermal transfer ink comprising a coloring agent and a heat-meltable vehicle containing a wax component, the wax component containing not less than 15% by weight of a wax, the wax being a reaction product obtained by reacting an alcohol mixture of a straight-chain aliphatic primary monohydric alcohol having 10 to 22 carbon atoms and 1 to 50% by mole, on the basis of the amount of the alcohol mixture, of an aliphatic polyhydric alcohol with tolylene diisocyanate in a ratio of NCO/OH=0.8 to 1.0 by mole. A thermal transfer element is also disclosed wherein on a support is provided a thermal transfer ink layer formed from the thermal transfer ink by a solvent coating method.

7 Claims, No Drawings

THERMAL TRANSFER INK AND THERMAL TRANSFER ELEMENT USING THE SAME

BACKGROUND OF THE INVENTION

The present invention relates to a thermal transfer ink and a thermal transfer element using the same.

Hitherto, there has widely been employed a thermal transfer ink for use in a thermal transfer element, which ink contains a coloring agent and a heat-meltable vehicle which is composed of a wax, or a wax and a heat-meltable resin.

However, in the case of a solvent coating type thermal transfer ink containing a wax which is dissolved or dispersed into a solvent for application, the coating liquid thereof needs to be kept under heating at a temperature higher than room temperature in the preparation and application thereof due to the poor solubility of the wax used. In removing the solvent by drying after the application, the solvent does not readily vaporize, i.e. the drying property of a wet coating of the coating liquid is poor, which causes problems such as a prolonged drying period and formation of an ununiform ink layer.

The dispersibility of coloring agents, such as carbon black, to waxes is generally poor, which causes agglomeration of the coloring agent in the ink. For this reason, both inks of solvent coating type and hot-melt coating type have problems such as poor ink stability, poor coating property and difficulty of forming printed images with a high density.

In view of the foregoing, it is an object of the present invention to provide a thermal transfer ink which is excellent all in solubility to a solvent for application, solvent drying property, ink stability, coating property and printing property (print image density) in spite of using a wax as a vehicle, and a thermal transfer element using the same.

This and other objects of the invention will become apparent from the description hereinafter.

SUMMARY OF THE INVENTION

The present invention provides a thermal transfer ink comprising a coloring agent and a heat-meltable vehicle containing a wax component, the wax component containing not less than 15% by weight of a wax, the wax being a reaction product obtained by reacting an alcohol mixture of a straight-chain aliphatic primary monohydric alcohol having 10 to 22 carbon atoms and 1 to 50% by mole, on the basis of the amount of the alcohol mixture, of an aliphatic polyhydric alcohol with tolylene diisocyanate in a ratio of NCO/OH=0.8 to 1.0 by mole. The present invention further provides a thermal transfer element comprising a support and a thermal transfer ink layer, the thermal transfer ink layer being formed by applying the foregoing thermal transfer ink onto the support by the use of a solvent and drying the resultant.

DETAILED DESCRIPTION

The wax used in the thermal transfer ink of the present invention is a reaction product obtained by reacting a mixture of a straight-chain aliphatic primary monohydric alcohol having 10 to 22 carbon atoms and an aliphatic polyhydric alcohol with tolylene diisocyanate in a ratio of NCO/OH=0.8 to 1.0 by mole, the content of the aliphatic polyhydric alcohol in the alcohol mixture being 1 to 50% by mole.

The specific wax is excellent in solubility to solvents used for application of a thermal transfer ink of solvent coating type, including aromatic solvents such as toluene and benzene, ketone solvents such as methyl ethyl ketone and methyl isobutyl ketone, and ester solvents such as ethyl acetate and butyl acetate. Further, after the wax is once dissolved in a solvent by heating, crystals of the wax are not precipitated even though the solution is allowed to stand. For the reason, a thermal transfer ink using the wax as a vehicle does not need to be kept under heating in preparation of a coating liquid thereof and application of the coating liquid.

A solution of the specific wax in a solvent has excellent drying properties. A solvent coating type thermal transfer ink using the wax is dried for a reduced drying time after coating and gives a uniform ink layer.

Further, the specific wax excellent for dispersibility of coloring agents such as carbon black. For the reason, use of the instant wax results in a thermal transfer ink wherein a coloring agent is uniformly dispersed regardless of the type of solvent coating or hot-melt coating and, hence, the resulting ink is excellent in storage stability and coating property, so that there can be obtained a thermal transfer element capable of giving printed images with a high density.

One component used in preparing the specific wax is an alcohol mixture of a straight-chain aliphatic primary monohydric alcohol having 10 to 22 carbon atoms and 1 to 50% by mole, preferably 5 to 45% by mole, on the basis of the amount of the alcohol mixture, of an aliphatic polyhydric alcohol. When the straight-chain aliphatic primary monohydric alcohol and the aliphatic polyhydric alcohol are not used in combination, there is not obtained a wax excellent all in solubility, solvent drying property, ink stability, coating property and printing property (print image density). When the content of the aliphatic polyhydric alcohol in the alcohol mixture is less than the above range, the desired results cannot be obtained. When the content of the aliphatic polyhydric alcohol in the alcohol mixture is more than the above range, there is obtained a wax having a low melting point which is poor in heat resistance.

The use of a secondary or tertiary alcohol, or an alcohol having branched carbon chain as a main alcohol component gives a soft wax having a low melting point which is poor in heat resistance. The use of a primary monohydric alcohol of which the carbon atom number is less than the above range gives a soft wax having a low melting point which is poor in heat resistance. A primary monohydric alcohol of which the carbon atom number is more than the above range is not readily available, which increases the cost of the resulting wax. Preferable is a primary monohydric alcohol having 14 to 20 carbon atoms.

Examples of the aforesaid straight-chain aliphatic primary monohydric alcohol include 1-decanol, 1-dodecanol, 1-tetradecanol, 1-pentadecanol, 1-hexadecanol, 1-octadecanol, 1-nonadecanol, 1-eicosanol and 1-docosanol. These monohydric alcohols may be used either alone or in combination.

Preferable as the aforesaid aliphatic polyhydric alcohol are dihydric or trihydric alcohols having 2 to 10 carbon atoms.

Examples of the aliphatic polyhydric alcohol are ethylene glycol, propylene glycol, 1,4-butanediol, 1,6-hexanediol, 1,10-decanediol and glycerol. These polyhydric alcohols may be used either alone or in combination.

The other component for use in preparing the specific wax in accordance with the present invention is tolylene diisocyanate. Usable as tolylene diisocyanate are 2,4-tolylene diisocyanate, 2,6-tolylene diisocyanate and a mixture thereof.

The aforesaid alcohol mixture and tolylene diisocyanate are reacted with each other in a ratio of NCO/OH=0.8 to 1.0 by mole. When the ratio of NCO/OH is less than the above range, the resulting reaction product assumes the properties of the alcohols used, has a higher melting point and is poor in solubility to solvents. When the ratio of NCO/OH is more than the above range, unchanged isocyanate group undesirably remains in the reaction product.

The reaction condition of the aforesaid reaction forming urethane is not particularly limited. Usually, however, the reaction is carried out in such a state that the starting materials are molten in the absence of a solvent. The reaction temperature is preferably from about 70° to 150° C. and the reaction time is preferably from about 0.5 to 5 hours.

The thus obtained reaction product may be purified, but can be used as it is for preparing the thermal transfer ink of the present invention.

The aforesaid specific wax preferably has a melting point of 50° to 100° C.

In turn, the thermal transfer ink of the present invention will be explained specifically.

The thermal transfer ink of the present invention comprises a coloring agent and a heat-meltable vehicle, the heat-meltable vehicle comprising a wax component, or a wax component and a heat-meltable resin component, the wax component containing not less than 15% by weight of the aforesaid specific wax (hereinafter referred to as "the instant wax").

When the content of the instant wax in the wax component is less than the above range, the above-mentioned excellent properties of the instant wax are not sufficiently exhibited.

The content of the wax component in the vehicle is preferably not less than 20% by weight, more preferably not less than 50% by weight, still more preferably not less than 70% by weight. The content of the wax component less than the above range leads to too low content of the instant wax, which results in poor solubility, drying property, ink stability, coating property and printing property.

As the waxes usable in combination with the instant wax, there can be employed any waxes conventionally used in inks of this type. Examples of these waxes include natural waxes such as haze wax, bees wax, carnauba wax, candelilla wax, montan wax and ceresine wax; petroleum waxes such as paraffin wax and microcrystalline wax; synthetic waxes such as oxidized wax, ester wax, low molecular weight polyethylene wax, Fischer-Tropsch wax and α-olefin-maleic anhydride copolymer wax; higher fatty acids such as myristic acid, palmitic acid, stearic acid and behenic acid; higher aliphatic alcohols such as stearyl alcohol and docosanol; esters such as higher fatty acid monoglycerides, sucrose fatty acid esters and sorbitan fatty acid esters; and amides and bisamides such as stearic acid amide and oleic acid amide. These waxes may be used either alone or in combination. From the viewpoint of thermal transfer sensitivity, preferable are waxes having a melting point of 40° to 120° C.

The thermal transfer ink of the present invention may be incorporated with a heat-meltable resin for the purposes of imparting to the ink an adhesiveness to a receptor paper, an appropriate film-forming property, and the like. In that case, the content of the heat-meltable resin in the vehicle is preferably not more than 30% by weight, more preferably from 5 to 30% by weight.

As the heat-meltable resin, there can be employed any heat-meltable resins conventionally used in inks of this type. Examples of these heat-meltable resins (including elastomers) include ethylene-vinyl acetate copolymer, vinyl chloride-vinyl acetate copolymer, vinyl chloride-vinyl acetate-maleic acid terpolymer, polyvinyl butyral, α-olefin-maleic anhydride copolymer, ethylene-(meth)acrylate copolymers, low molecular weight styrene polymer, ethylene-styrene copolymer, styrene-butadiene copolymer, petroleum resins, rosin resins, terpene resins, polypropylene resin and ionomers. These heat-meltable resins may be used either alone or in combination. From the viewpoint of thermal transfer sensitivity, preferable are heat-meltable resins having a softening point of 40° to 140° C.

Among the aforesaid heat-meltable resins, preferable are ethylene-vinyl acetate copolymer and/or ethylene-(meth)acrylate copolymer. When the instant wax is used in combination with these copolymers, an especially enhanced effect of improving the dispersibility of coloring agents is exhibited due to the synergistic effect of both components. The (meth)acrylate unit in the ethylene-(meth)acrylate copolymer is preferably alkyl (meth)acrylate. The alkyl group in the alkyl (meth)acrylate includes straight-chain or branched chain alkyl groups having 1 to 12 carbon atoms. Examples of these alkyl groups are methyl, ethyl, propyl, n-butyl, isobutyl, hexyl and nonyl. These (meth)acrylates may be used either alone or in combination.

When the wax component is used in combination with the heat-meltable resin component, the heat-meltable vehicle preferably comprises 70 to 95% by weight of the wax component and 5 to 30% by weight of the heat-meltable resin component.

Usable as the aforesaid coloring agent are pigments for various hues such as yellow, magenta and cyan as well as carbon black. A dye may be used in combination with a pigment.

Examples of pigments for yellow include Naphthol Yellow S, Hansa Yellow 5G, Hansa Yellow 3G, Hansa Yellow G, Hansa Yellow GR, Hansa Yellow A, Hansa Yellow RN, Hansa Yellow R, Benzidine Yellow G, Benzidine Yellow GR, Permanent Yellow NCG and Quinoline Yellow Lake. These pigments may be used singly or in combination of two or more species thereof.

Examples of pigments for magenta include Permanent Red 4R, Brilliant Fast Scarlet, Brilliant Carmine BS, Permanent Carmine FB, Lithol Red, Permanent Red F5R, Brilliant Carmine 6B, Pigment Scarlet 3B, Rhodamine Lake B, Rhodamine Lake Y and Arizalin Lake. These pigments may be used singly or in combination of two or more species thereof.

Examples of pigments for cyan include Victoria Blue Lake, metal-free Phthalocyanine Blue, Phthalocyanine Blue and Fast Sky Blue. These pigments may be used singly or in combination of two or more species thereof.

The coloring agent is usually used in a range of 10 to 30% by weight relative to the total amount of the ink. Since the dispersibility of the coloring agent is good according to the present invention, the coloring agent can be contained in a high concentration, for example, a maximum of 50% by weight, thereby providing an advantage that printed images with a high density can be obtained. Further, since the dispersibility of the coloring agent is good, the present invention has an advantage that printed images with a practically sufficient density can be obtained even when the coloring agent is contained in a low concentration; for example, a minimum of 5% by weight.

The thermal transfer ink of the present invention can be incorporated with one or more usual additives conventionally used in inks of this type, such as dispersing agent, antistatic agent, antioxidant and ultraviolet light absorbent, besides the foregoing components.

The thermal transfer ink of the present invention is prepared as follows: A solvent coating type ink can be prepared by dispersing or dissolving the aforesaid components into an appropriate solvent and uniformly mixing the resultant. Examples of the solvent include aromatic solvents such as toluene, benzene and xylene, ketone solvents such as methyl ethyl ketone and methyl isobutyl ketone, ester solvents such as ethyl acetate and butyl acetate, alcohol solvents such as methyl alcohol and isopropyl alcohol, and hydrocarbon solvents such as n-hexane and heptane. These solvents may be used either alone or in combination. A hot-melt coating type ink can be prepared by uniformly kneading the aforesaid components at a temperature of not lower than the melting temperature of the vehicle.

The thermal transfer ink of the present invention is advantageous especially as a solvent coating type ink because the ink is excellent in solubility to solvents and solvent drying property.

The thermal transfer ink of the present invention is usable for various types of thermal transfer elements, including one-time type thermal transfer element wherein a homogeneous ink layer is provided on a support, a squeezing-out type multi-usable thermal transfer element wherein a non-transferable porous layer containing the thermal transfer ink is provided on a support, and a shaving type multi-usable thermal transfer element wherein on a support is provided a thermal transfer ink layer which further contains a barrier material such as carbon black in the thermal transfer ink and which is transferable in portions relative to the thickness direction of the ink layer at every time when the ink layer is heated.

Preferable as the support are those having an appropriate heat-resistance and a good thermal conductivity. Examples of the support include plastic films such as polyester films (such as polyethylene terephthalate film, polyethylene naphthalate film, polyarylate film and polybutylene terephthalate film), polyethylene films, polypropylene films, polystyrene films, polycarbonate films, polyamide films, polyamideimide films, polyimide films and aramid films, and high density papers such as glassine paper and condenser paper. The thickness of the support is preferably within the range of about 2 to 10 μm.

If desired, on the opposite side (the side adapted to be brought into slide contact with a thermal head) of the support may be formed a conventionally known stick-preventive layer composed of one or more of various heat-resistant resins such as silcone resin, fluorine-containing resin, nitrocellulose resin, other resins modified with these heat-resistant resins including silicone-modified urethane resins, and mixtures of the foregoing heat-resistant resins and lubricating agents.

The present invention will be described in more detail by way of Examples thereof. It is to be understood that the present invention is not limited to these Examples, and various changes and modifications may be made in the invention without departing from the spirit and scope thereof.

PREPARATION EXAMPLE 1

A mixture of 147.0 (0.543 mole) of 1-octadecanol and 22.5 g (0.363 mole) of ethylene glycol, and 106.1 g (0.61 mole) of tolylene diisocyanate (TDI-80, made by Nippon Polyurethane Kogyo Kabushiki Kaisha) were heated with stirring at 120° C. for 3 hours to give 270 g of the instant wax having a melting point of 57° C. (hereinafter referred to as "wax A").

PREPARATION EXAMPLES 2 TO 4 AND COMPARATIVE PREPARATION EXAMPLE 1

The same procedures as in Preparation Example 1 except that the starting materials shown in Table 1 were used in the proportions shown in Table 1 were repeated to give wax B, wax C, wax D and wax E, respectively. The melting points of the obtained waxes are shown in Table 1.

TABLE 1

| | Preparation Ex. 1 | Preparation Ex. 2 | Preparation Ex. 3 | Preparation Ex. 4 | Comparative Preparation Ex. 1 |
|---|---|---|---|---|---|
| Wax No. | A | B | C | D | E |
| Primary monohydric alcohol | 1-Octadecanol | 1-Octadecanol | 1-Octadecanol | 1-Hexadecanol | 1-Octadecanol |
| Polyhydric alcohol Kind | Ethylene glycol | Ethylene glycol | 1,10-Decanediol | Ethylene glycol | — |
| Content (% by mole) | 40 | 10 | 40 | 20 | — |
| NCO/OH (by mole) | 0.96 | 0.96 | 0.96 | 0.96 | 0.98 |
| Melting point (°C.) | 57 | 93 | 92 | 62 | 85 |

EXAMPLES 1 TO 4 AND COMPARATIVE EXAMPLES 1 TO 3

Fifty parts (parts by weight, hereinafter the same) of each wax shown in Table 2 was added to 50 parts of toluene and the mixture was heated to completely dissolve the wax. The obtained solution was allowed to stand at room temperature and the temperature at which the solution began to be turbid, i.e. cloud point, was determined to evaluate the solubility of the wax.

Fifteen parts of each wax shown in Table 2 was added to 35 parts of toluene and the mixture was heated to completely dissolve the wax. The obtained solution was cooled to room temperature. One ml of the solution was dropped onto a glass plate and spread into a thin wet film. The state of the wet film was observed with the passage of time. The drying property of the wet film was rated into the following three stages:

○ . . . The wet film dried immediately to give a uniform dry film.

Δ . . . The wet film dried immediately but the resulting dry film was ununiform due to ununiform drying.

X . . . The wet film did not dry and caused gelation.

The results are shown in Table 2.

TABLE 2

| | Ex. 1 | Ex. 2 | Ex. 3 | Ex. 4 | Com. Ex. 1 | Com. Ex. 2 | Com. Ex. 3 |
|---|---|---|---|---|---|---|---|
| Wax. No. | A | B | C | D | E | Paraffin 145° F. | Diacarna 30* |
| Cloud point (°C.) | 17 | 42 | 36 | 36 | 56<br>Δ | >60<br>X | 56 |
| Drying property | O | O | O | O | X | X | Δ |

*α-olefin-maleic anhydride copolymer wax having a melting point of 73° C., made by Mitsubishi Kasei Corporation

EXAMPLES 5 TO 12 AND COMPARATIVE EXAMPLES 4 TO 6

Coating liquids for thermal transfer ink were prepared according to the below-mentioned basic formula using as the wax component the waxes shown in Table 3. The carnauba wax shown in Table 3 was one having a melting point of 84° C. The term "wax ratio" means the weight ratio of the instant wax/other wax. The proportions of other waxes in Comparative Examples 5 and 6 are as follows:

(Comparative Example 5)

Wax E*/Paraffin 145° F.=2/8 by weight

* Obtained in Comparative Preparation Example 1

(Comparative Example 6)

Diacarna 30/Carnauba wax=2/8 by weight

| Basic formula | |
|---|---|
| Component | Part |
| Wax component | 6.0 |
| Ethylene-vinyl acetate copolymer (softening point: 42° C.) | 2.0 |
| Carbon black | 2.0 |
| Toluene | 40.0 |

The obtained ink coating liquids were evaluated with respect to ink stability, coating property and printing property (printed image density) in the following manners:

(1) Ink stability

Each ink coating liquid was allowed to stand at ordinary temperature for 24 hours after the preparation thereof and then the fluidity of the coating liquid was observed.

O . . . The fluidity was as good as that immediately after the preparation.

Δ . . . The fluidity was inferior to that immediately after the preparation.

X . . . The coating liquid caused gelation to lose fluidity.

(2) Coating property

Each ink coating liquid, immediately after the preparation, was applied in a coating amount of 4 g/m$^2$ after being dried onto a polyethylene terephthalate film having a thickness of 6 μm and dried by means of hot air at 50° C., yielding a thermal transfer element. The ink layer of the obtained thermal transfer element was observed by the naked eye to evaluate the coating property.

O . . . A uniform ink layer was obtained.

Δ . . . A small number of parts wherein carbon black was agglomerated were observed.

X . . . A large number of parts wherein carbon black was agglomerated were observed. Ununiform drying was also observed.

(3) Printing property

The thermal transfer element obtained in the above (2) was used in a thermal transfer type bar code printer (B-30 made by Tokyo Electric Co., Ltd. ) and printing was performed at a printing energy of 0.27 mJ/dot to form printed images on a light weight coat paper having a Bekk smoothness of 250 seconds. The optical density (OD value) of the obtained images was determined by means of Macbeth densitometer, RD-914.

The results are shown in Table 3.

TABLE 3

| | Ex. 5 | Ex. 6 | Ex. 7 | Ex. 8 | Ex. 9 | Ex. 10 | Ex. 11 | Ex. 12 | Com. Ex. 4 | Com. Ex. 5 | Com. Ex. 6 |
|---|---|---|---|---|---|---|---|---|---|---|---|
| Instant wax | A | B | C | D | A | B | C | D | C | — | — |
| Other wax | Carnauba wax | Paraffin 145° F. | Carnauba wax | Paraffin 145° F. | Carnauba wax | Paraffin 145° F. | Carnauba wax | Paraffin 145° F. | Carnauba wax | Wax E/ Paraffin 145° F. | Diacarna 30/carnauba wax |
| Wax ratio | 2/8 | 2/8 | 2/8 | 2/8 | 8/2 | 8/2 | 8/2 | 8/2 | 1/9 | 0/10 | 0/10 |
| Ink stability | O | O | O | O | O | O | O | O | Δ | X | Δ |
| Coating property | O | O | O | O | O | O | O | O | O | X | Δ |
| OD value | 2.0 | 1.8 | 2.0 | 1.8 | 2.1 | 1.8 | 2.1 | 1.8 | 1.6 | 0.8 | 1.6 |

In addition to the materials and ingredients used in the Examples, other materials and ingredients can be used in the Examples as set forth in the specification to obtain substantially the same results.

As has been described, the thermal transfer ink of the present invention are excellent all in solubility to solvents, drying property, ink stability, coating property and printing property.

What we claim is:

1. A thermal transfer ink composition comprising a coloring agent and a heat-meltable vehicle containing a wax component, the wax component containing not less than 15% by weight of a wax, the wax being a reaction product obtained by reacting an alcohol mixture of a straight-chain aliphatic primary monohydric alcohol having 10 to 22 carbon atoms and 1 to 50% by mole, on the basis of the amount of the alcohol mixture, of an aliphatic polyhydric alcohol with tolylene diisocyanate in a ratio of NCO/OH=0.8 to 1.0 by mole.

2. The thermal transfer ink composition of claim 1, wherein the content of the polyhydric alcohol in the alcohol mixture is 5 to 45% by mole.

3. The thermal transfer ink composition of claim 1, wherein the polyhydric alcohol has 2 to 10 carbon atoms.

4. The thermal transfer ink composition of claim 1, wherein the content of the wax component in the heat-meltable vehicle is not less than 20% by weight.

5. The thermal transfer ink composition of claim 1, wherein the content of the wax component in the heat-meltable vehicle is not less than 50% by weight.

6. The thermal transfer ink composition of claim 1, wherein the heat-meltable vehicle comprises 70 to 95% by weight of the wax component and 5 to 30% by weight of a heat-meltable resin.

7. A thermal transfer element comprising a support and a thermal transfer ink layer provided on the support, the thermal transfer ink layer being formed by applying a thermal transfer ink composition onto the support by the use of a solvent and drying the resultant, the thermal transfer ink composition comprising a coloring agent and a heat-meltable vehicle containing a wax component, the wax component containing not less than 15% by weight of a wax, the wax being a reaction product obtained by reacting an alcohol mixture of a straight-chain aliphatic primary monohydric alcohol having 10 to 22 carbon atoms and 1 to 50% by mole, on the basis of the amount of the alcohol mixture, of an aliphatic polyhydric alcohol with tolylene diisocyanate in a ratio of NCO/OH=0.8 to 1.0 by mole.

* * * * *